United States Patent
Kanemitsu et al.

(10) Patent No.: US 6,625,887 B1
(45) Date of Patent: Sep. 30, 2003

(54) SHEET METAL-MADE POLY V-GROOVED PULLEY AND METHOD OF MANUFACTURING THE PULLEY

(75) Inventors: Toshiaki Kanemitsu, Kobe (JP); Shinji Sugimoto, Akashi (JP)

(73) Assignee: Kanemitsu Corporation, Hyogo (JP)

( * ) Notice: Subject to any disclaimer, the term of this patent is extended or adjusted under 35 U.S.C. 154(b) by 0 days.

(21) Appl. No.: 09/736,026

(22) PCT Filed: May 13, 1999

(86) PCT No.: PCT/JP99/02475

§ 371 (c)(1),
(2), (4) Date: Dec. 20, 2000

(87) PCT Pub. No.: WO00/70243

PCT Pub. Date: Nov. 23, 2000

(51) Int. Cl.⁷ .................................................. B23P 17/00
(52) U.S. Cl. ...................................... 29/892.3; 474/170
(58) Field of Search ............................ 474/170; 29/892, 29/892.3

(56) References Cited

U.S. PATENT DOCUMENTS

| | | | | |
|---|---|---|---|---|
| 4,023,250 A | * | 5/1977 | Sproul et al. | 29/892.3 |
| 4,273,547 A | * | 6/1981 | Bytzek | 29/892.3 |
| 4,551,122 A | * | 11/1985 | Kraft et al. | 29/892.3 |
| 4,631,946 A | * | 12/1986 | Oda | 29/892.3 |
| 5,072,509 A | * | 12/1991 | Bichel et al. | 29/892.3 |
| 5,862,696 A | * | 1/1999 | Temmann | 29/892.3 |

FOREIGN PATENT DOCUMENTS

| | | | | |
|---|---|---|---|---|
| JP | 57-195551 | * | 12/1982 | 29/892.3 |
| JP | 62-156035 | * | 7/1987 | 29/892 |
| JP | 4-52 | | 1/1992 | |
| JP | 4-157254 | | 5/1992 | |
| JP | 7-116760 | | 5/1995 | |

* cited by examiner

Primary Examiner—Thomas R. Hannon
Assistant Examiner—Vicky A. Johnson
(74) Attorney, Agent, or Firm—Jones, Tullar & Cooper, P.C.

(57) ABSTRACT

The present invention relates to a cylindrical poly-V pulley made of metal sheet suitable for forcedly fitting a one-way clutch or a bearing. The present invention can easily provide thick ears for preventing a V-belt from disengaging, and ensure an enough length of an axial straight line of a bore of a peripheral wall. Ears for preventing the V-belt from disengaging, are protrusively shaped in an annular state on axially both ends on an outer surface of a cylindrical peripheral wall. Each ear includes an inner ear portion outwardly protruded from both ends of the peripheral wall and an outer ear portion folded back from the protruded outer end of the inner ear portion to the outer surface of the inner ear portion so as to be closely overlapped with each other, and the inner end surface of the ear is flush with the inner surface of the peripheral wall. Therefore, the ear can be thickened by an overlap structure by the inner and outer ear portions, and the length of the axial straight line of the bore of the peripheral wall can be ensured for the and the length of the axial straight line of the bore of the peripheral wall can be ensured for the thickness of the outer ear portion.

1 Claim, 8 Drawing Sheets

SHEET METAL-MADE POLY V-GROOVED PULLEY AND METHOD OF MANUFACTURING THE PULLEY

TECHNICAL FIELD

The present invention relates to a poly-V pulley made of metal sheet used together with a V-belt for transmitting a rotational power and a method of manufacturing the same.

BACKGROUND ART

As a poly-V pulley of this kind, for the usage purpose of insertion and coupling onto a shaft via a one-way clutch or a bearing, known is a poly-V pulley of a structure in which a cylindrical peripheral wall is formed, an ear for preventing a V belt from disengaging is outwardly and protrusively formed in each of the axial ends of the outer peripheral face of the peripheral wall, and poly-V grooves are formed between both ears.

Generally, such a poly-V pulley is made of cast iron. However, the poly-V pulley made of cast iron is heavy. Moreover, the poly-V grooves are formed by cutting operations, thereby causing a problem of scattering many cut powders in workshops and worsening working environment. On the other hand, the poly-V pulley made of metal sheet, which is made of a flat plate material such as a rolled steel, has advantages: it is more durable, more lightweight and cheaper than the poly-V pulley made of cast iron.

The poly-V pulley made of metal sheet is disclosed in a gazette of Japanese Patent Laying-Open No. 8-300082. The disclosed poly-V pulley has steps wherein, preparatory to forming ears for preventing a V belt (called a belt guide in the gazette) from disengaging, on both axial ends of a peripheral wall portion, preliminary ears (called a portion in the gazette where a guide is formed) are formed on both ends of the cylindrical peripheral wall by means of a press process and a splitting process, and each preliminary ear whose structure is a single layer having a predetermined shape is subsequently shaped in the following step.

However, the ear having a single layer is thin so that the mechanical strength thereof is inferior. In order to obtain an ear having enough rigidity and an enough protrusive length, a thick blank is required. However, it is not easy to draw a thick blank so as to become a cup-shape with a bottom surface.

Then, an object of the present invention is to provide a poly-V pulley made of metal sheet having a superior rigidity, which makes it possible to obtain easily thick ears from the flat plate material whose thickness is not so great and which is easily drawn, and to ensure the length of the axial straight line of a bore of the cylindrical peripheral wall suitable for forcedly inserting the one-way clutch and the bearing, and a method of manufacturing the same.

SUMMARY OF THE INVENTION

A poly-V pulley made of metal sheet according to the present invention comprises:

poly-V grooves disposed between both ears on the outer surface of the peripheral wall, wherein at least one of both ears includes an inner ear portion protruded from the end of the peripheral wall to the outward direction, and an outer ear portion folded back from the protruded outer end of the inner ear portion to an outer surface of the inner ear portion, so as to be closely fitted therewith, and the inner end surface of the ear is formed to be flush with the inner surface of the peripheral wall.

According to the poly-V pulley made of metal sheet, the inner and outer ear portions are folded to overlap with each other, thereby ensuring enough thickness of the ears so as to increase the rigidity, and making it possible to increase the length of the axial straight line of a bore of the peripheral wall only for a thickness of the outer ear portion. This is enough to ensure an effective contact supporting surface with the outer surface of the one-way clutch or the bearing which are forcedly fit into the inner surface of the peripheral wall.

In case that each ear on both ends thereof has a sectional structure wherein the inner and outer ear portions are folded so as to overlap each other, its rigidity is more enhanced than that of a case where only one ear has such a sectional structure. Therefore, the inner surface of the peripheral wall is finished by machining so as to have a predetermined inside diameter measurement and become completely circular, thereby making it possible to achieve an accurate finish so as to be suitable or forcedly fitting a one-way clutch, a bearing or the like.

A method of manufacturing a poly-V pulley made of metal sheet having the above structure, according to the present invention, comprises the steps of:

forming a cup-shaped forming body which has a bulging middle portion-peripheral wall like a barrel, integrated with an outer periphery of a circular bottom wall;

preparing a roller for forming ears provided with a concave forming surface and an annular projection, the concave forming surface which is concavely arc-shaped being disposed on an axial center portion of the outer surface, and the annular projection whose section is V-shaped being disposed on axially both ends of the concave forming surface;

applying a compressive load to the cup-shaped forming body in the axial direction at the same time while pressing the annular projection of the roller for forming ears against the outer surface of the bulging middle portion-peripheral wall in a radially inward direction thereof, folding at least axial one end of the bulging middle portion-peripheral wall into two, and protrusively forming inner and outer ear portions overlapped so as to be closely fitted with each other;

pressing a straightening roller having a shaping surface perpendicular to the outer periphery of the bulging middle portion-peripheral wall, against the outer surface of the bulging middle portion-peripheral wall in the radially inward direction thereof, straightening the bulging middle portion-peripheral wall so as to be parallel with the axial direction, and forming the perpendicular peripheral wall;

shaping the each poly-V groove between the ears on the outer surface of the perpendicular peripheral wall by means of rolling;

shearing a connecting portion between the bottom wall of the perpendicular peripheral wall and the ear, so as to remove the bottom wall; and finally performing a machining work so as to make the inner end surface of the ear flush with the inner surface of the perpendicular peripheral wall.

According to such a manufacturing method, the compressive load is axially applied to the bulging middle portion-peripheral wall of the cup-shaped forming body, while the annular projections of the roller for forming ears are radially pressed against it. This can facilitate folding at least one end of the bulging middle portion-peripheral wall so as to closely fit the inner ear portion with the outer ear portion and be overlapped.

BEST MODE FOR CARRYING OUT THE INVENTION

An embodiment of a poly-V pulley made of metal sheet according to the present invention will be described with reference to the drawings.

Figure 1:
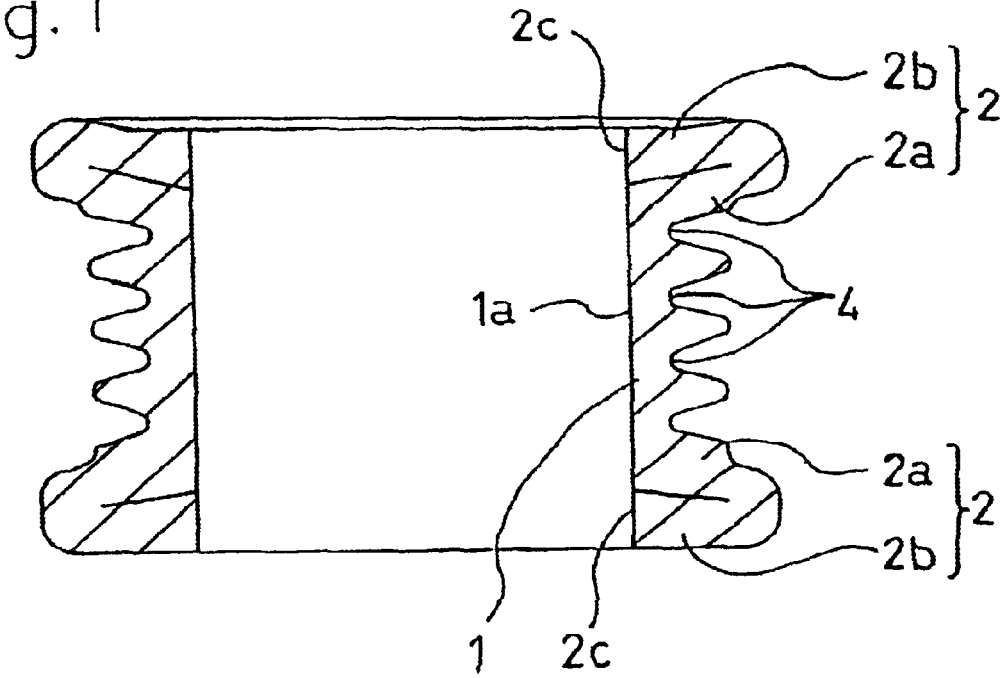
FIG. 1 is a sectional view of an embodiment of a poly-V pulley made of metal sheet according to the present invention.

FIG. 1 is a sectional view of a poly-V pulley made of metal sheet, manufactured by the embodiment of the present invention. The poly-V pulley made of metal sheet comprises a cylindrical peripheral wall 1, annular ears 2 protrusively formed from axial both ends on an outer surface of the cylindrical wall 1 to an outward direction, and poly-V grooves 4 formed between the ears 2, 2 on the outer surface of the body 1. The poly-V pulley made of metal sheet, for example, is inserted in a shaft for transmitting motive power via a one-way clutch or a bearing so as to join them. The ears 2, 2 are preventive walls for preventing a poly-V belt from accidentally going over the poly-V grooves 4 under the condition wherein the poly-V belt hangs on the poly-V grooves 4.

Each of ear 2, 2 includes an inner ear portion 2a and an outer ear portion 2b. The inner ear portion 2a is protruded from the axial ends of the peripheral wall 1 to the outside. The outer ear portion 2b is folded back from the protruded outer end of the inner ear portion 2a to the outer surface of the inner ear portion 2a, so as to make them closely fitted. An inner end surface 2c of the ear 2 is formed to be flush with an inner surface 1a of the peripheral wall 1.

The ear 2 has a double section structure wherein the inner and outer ear portions 2a and 2b are folded, thereby enhancing rigidity between each ear 2 and both ends of the peripheral wall 1. Moreover, a length of an axial straight line of the inward radial portion of the peripheral wall 1 can be increased only for a thickness of the outer ear portion 2b in comparison with a single layer wherein the ear 2 comprises only an inner ear portion 2a, thereby ensuring a larger contact surface between the outer surface of the one-way clutch or the bearing which is forcedly inserted into a bore of the peripheral wall 1 and the inner surface 1a of the peripheral wall 1.

Next, the embodiment of a method of manufacturing a poly-V pulley made of metal sheet according to the present invention will be described with reference to FIGS. 2 to 10.

Figure 2:
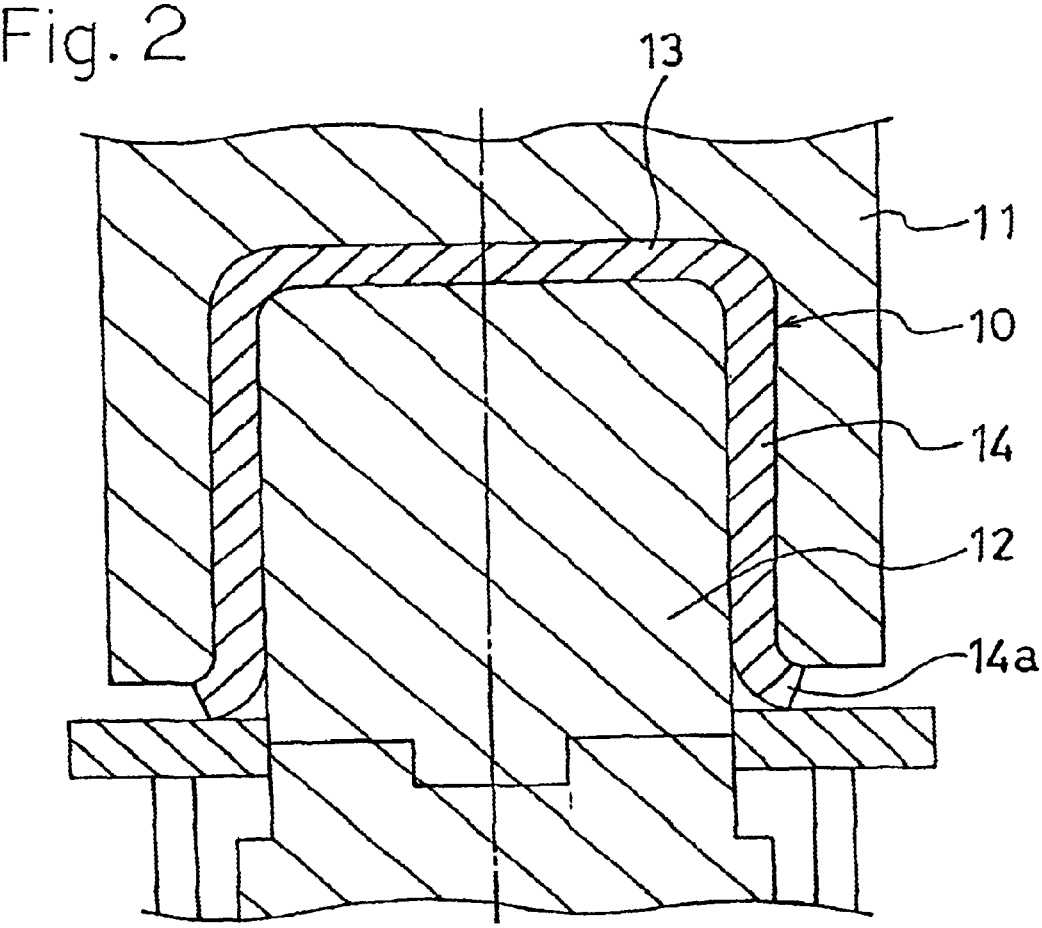
FIG. 2 is a diagram of a first step in manufacturing the poly-V pulley made of metal sheet according to the present invention.

FIG. 2 shows a first step. In the first step, a metal flat plate material such as a rolled steel is circularly punched, thereby obtaining a blank. The blank is drawn so as to form a cup-shaped forming body 10. In the step, the blank is drawn and shaped by upper and lower dies 11 and 12, thereby obtaining the cup-shaped forming body 10 including a flat bottom wall 13, a peripheral wall forming portion 14 connectedly to the outer periphery of the bottom wall 13, and a protruded edge 14a protruded in a widening state from an open-side end of the peripheral wall forming portion 14 to the slightly outward direction.

Figure 3:
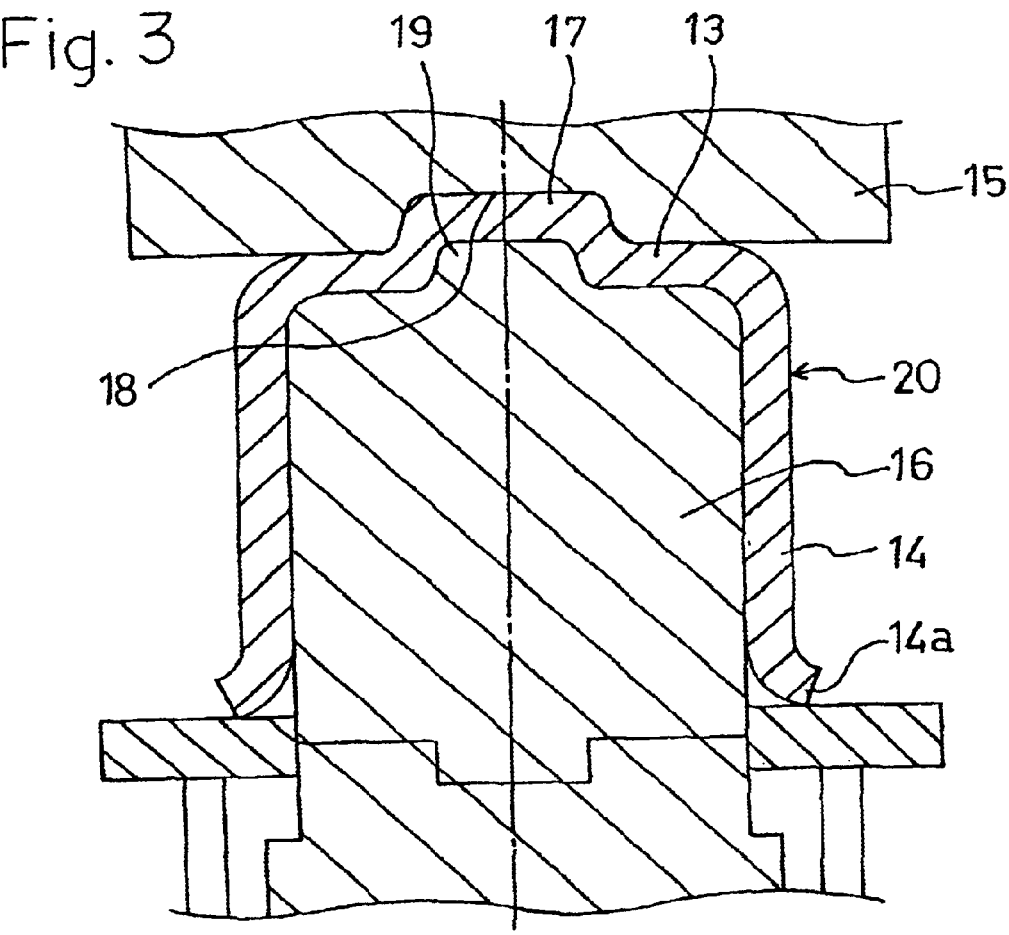
FIG. 3 is a diagram of a second step in manufacturing the same.

FIG. 3 shows a second step. In this step, upper and lower dies 15 and 16 are used. The upper die 15 is provided with a recessed portion 18 for shaping a bulging portion. The lower die 16 is provided with a protruded portion 19 for shaping a bulging portion. Between the upper and lower dies 15 and 16, the cup-shaped forming body 10 obtained by the first step is clamped, so as to draw a bulging portion 17 on the center of the bottom wall 13 thereof, thereby obtaining a cup-shaped forming body 20.

Figure 4:
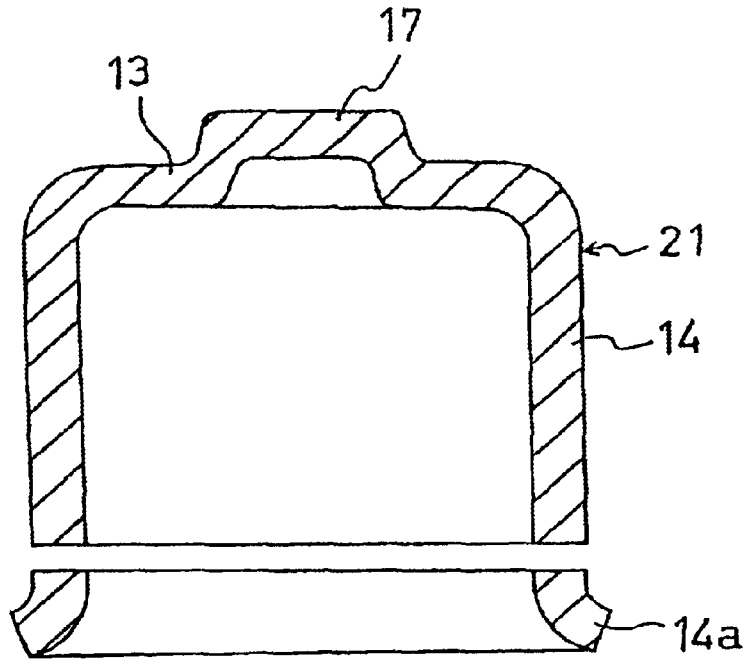
FIG. 4 is a diagram of a third step in manufacturing the same.

FIG. 4 shows a third step. The step is a trimming step for obtaining a cup-shaped forming body 21. In other words, the protruded edge 14a of the peripheral wall forming portion 14 of the cup-shaped forming body 20 obtained by the second step is cut so as to leave only the peripheral wall forming portion 14 with a uniform thickness.

Figure 5A:
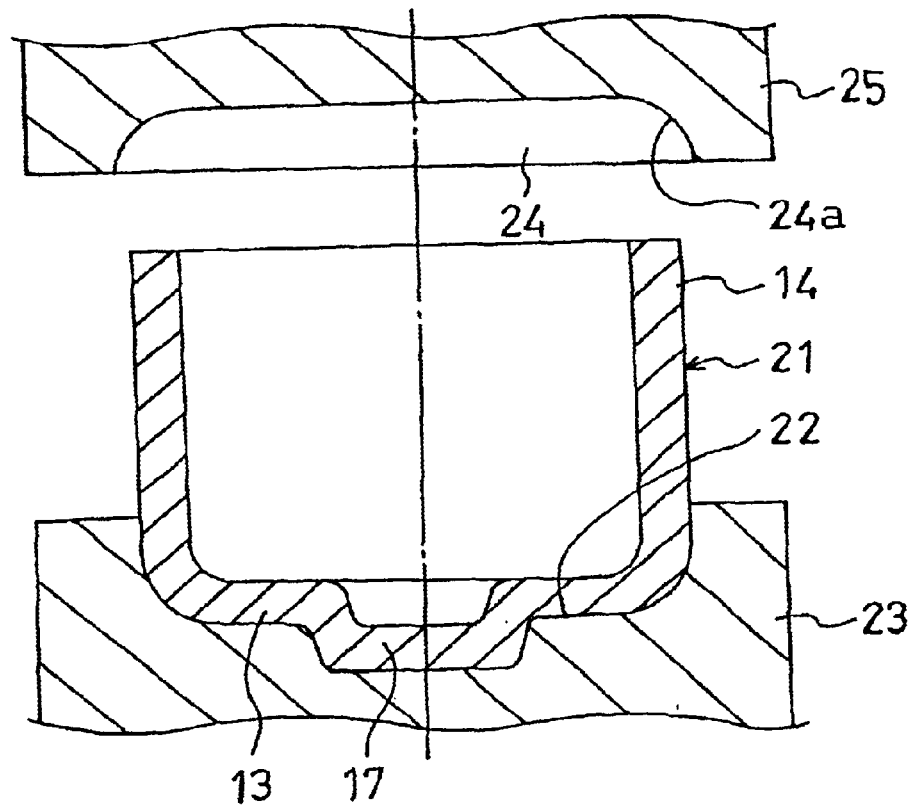
FIGS. 5A and 5B are diagrams respectively showing a fourth step for manufacturing the same.
Figure 5B:
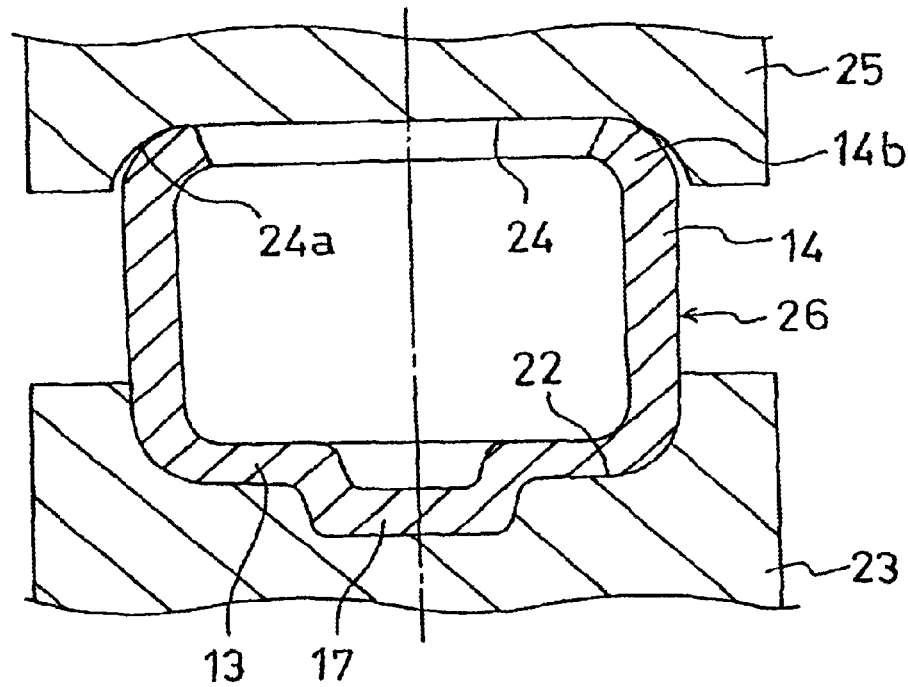

FIGS. 5A and 5B show a fourth step. FIG. 5A shows a state previous to applying a process. FIG. 5B shows a state after applying a process. In the fourth step, as shown in FIG. 5A, a lower die 23 is prepared, which has a recessed portion 22 to fit an outer shape of the bottom wall 13 of the cup-shaped forming body 21 obtained by the third step. The cup-shaped forming body 21 is set on the recessed portion 22 of the lower die 23 so that an opening mouth may be directed upward. As shown in FIG. 5B, an upper die 25 which has a recessed portion 24 with a round corner portion 24a, is lowered so that an open edge 14b of the peripheral wall forming portion 14 is inwardly bent at the round corner portions 24a of the recessed portion 24, thereby obtaining a cup-shaped forming body 26. The fourth step is a step for facilitating bulging of the peripheral wall forming portion 14 like a barrel in a fifth step for bulging.

Figure 6A:
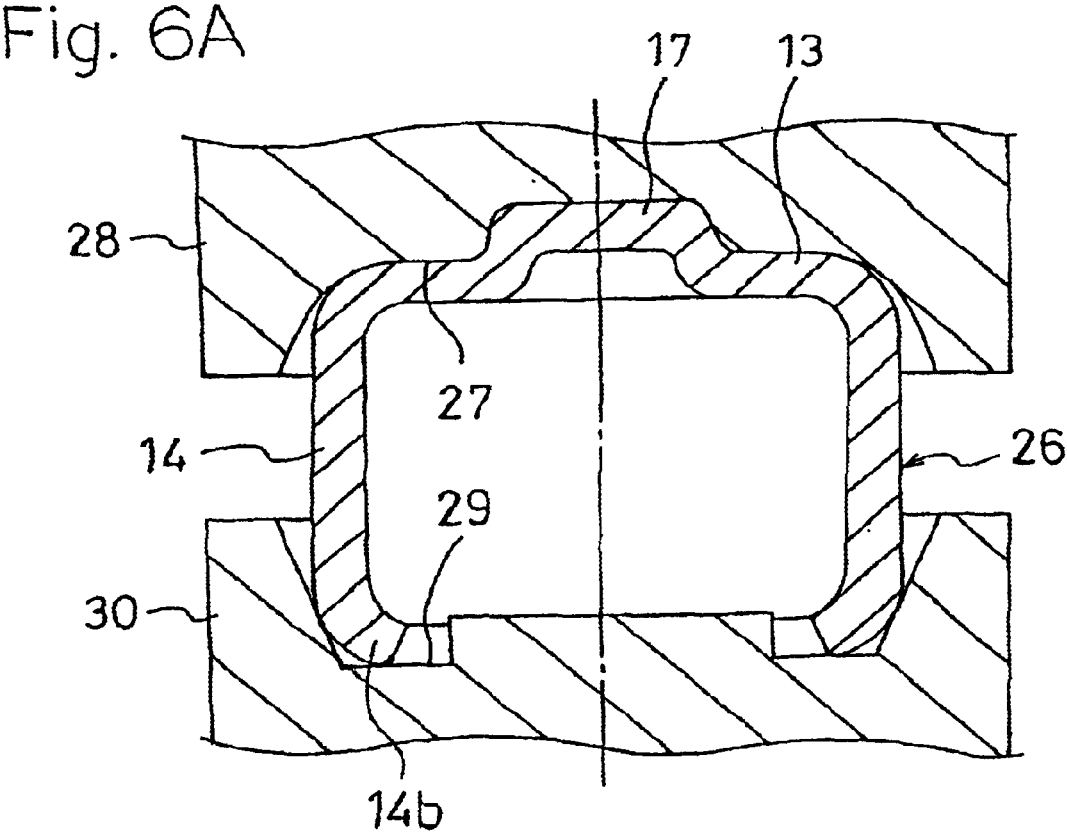
FIGS. 6A and 6B are diagrams respectively showing a fifth step for manufacturing the same.
Figure 6B:
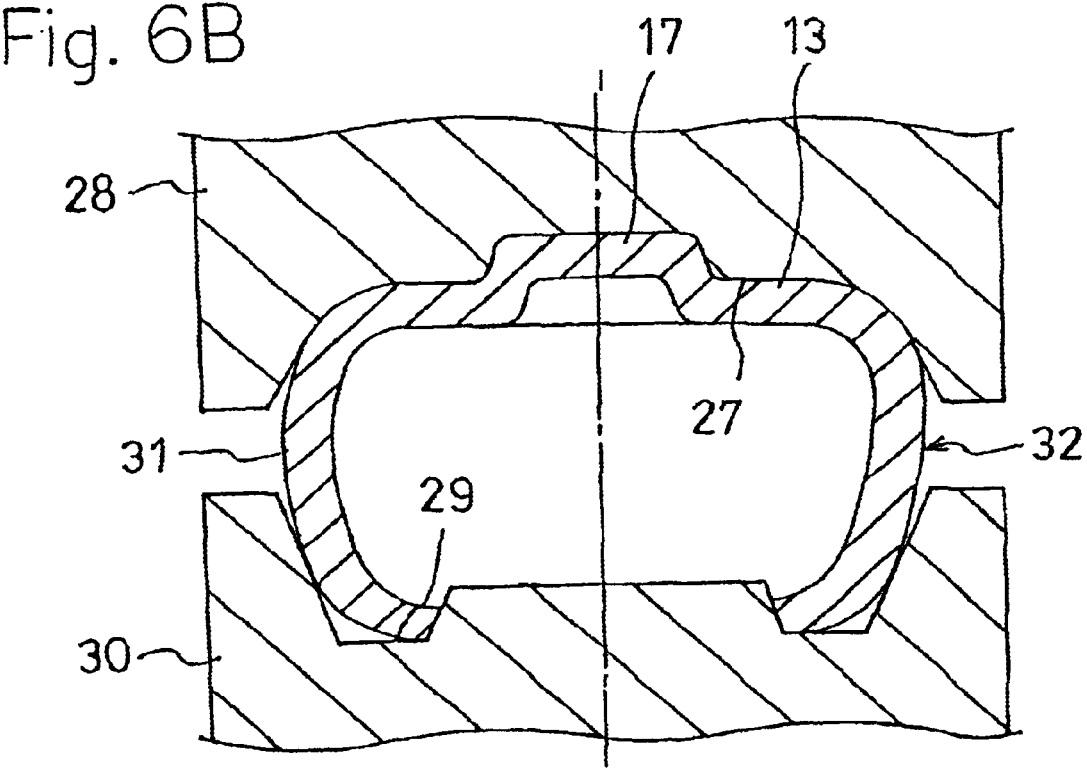

FIGS. 6A and 6B show the fifth step. FIGS. 6A and 6B show respectively a state previous to applying a process, and a state after applying the process. In the fifth step, as shown in FIG. 6A, upper and lower dies 28 and 30 are used. The upper die 28 has a recessed portion 27 to fit an outer shape of the bottom wall 13 of the cup-shaped forming body 26 obtained by the fourth step, and a lower die 30 has an annular groove 29 which can be loosely fitted to the open edge 14b curved to an inside of the peripheral wall forming portion 14 of the cup-shaped forming body 26. The open edge 14b curved to the inside of the peripheral wall forming portion 14 of the cup-shaped forming body 26 is loosely fitted to the annular groove 29 of the lower die 30. The bottom wall 13 of the cup-shaped forming body 26 is fitted to the recessed portion 27 of the upper die 28. Then, as shown in FIG. 6B, the upper die 28 is lowered thereby buckling the cup-shaped forming body 26 by means of an axial load. As a result, the peripheral wall forming portion 14 is bulged in a barrel state, thereby obtaining a cup-shaped forming body 32 which is provided with a bulging middle portion-peripheral wall 31.

Figure 7A:
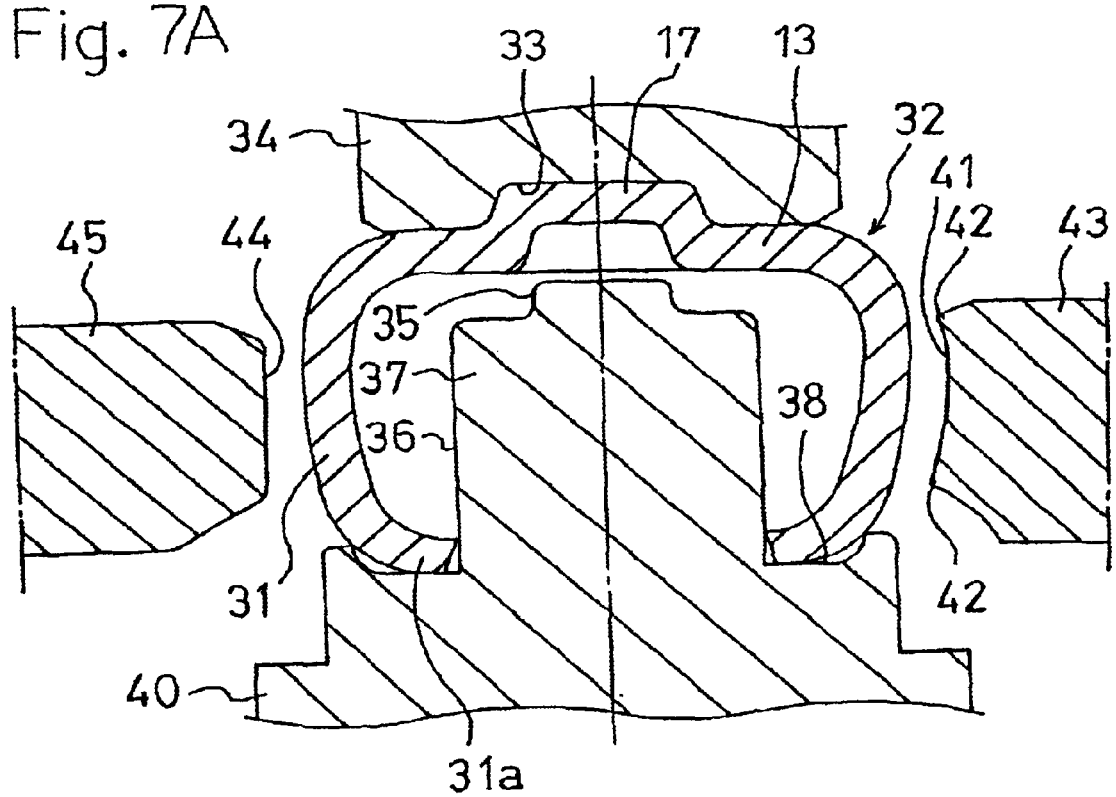
FIGS. 7A, 7B and 7C are diagrams respectively showing a sixth step for manufacturing the same.
Figure 7B:
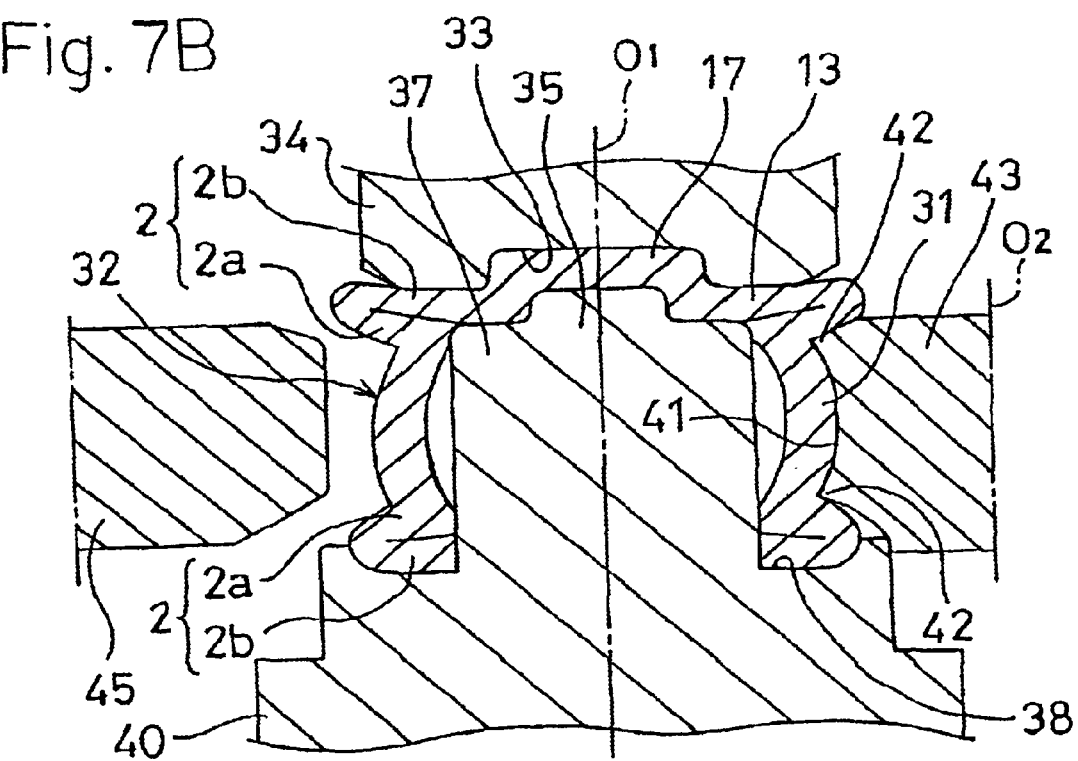
Figure 7C:
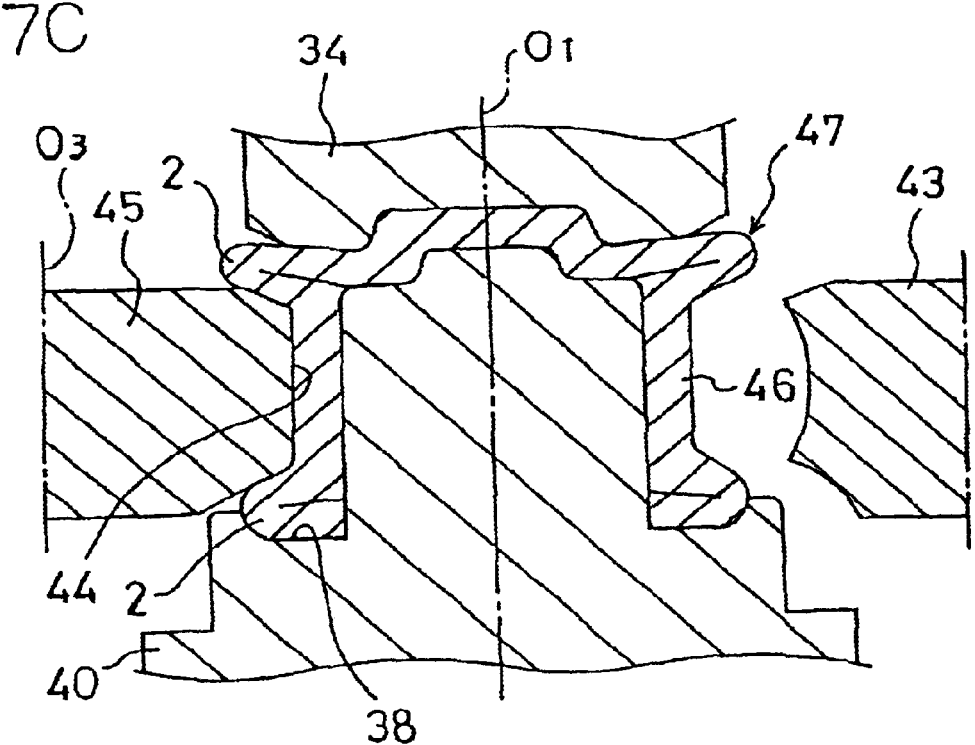

FIGS. 7A, 7B and 7C show a sixth step. FIG. 7A shows a state previous to applying a process, and FIGS. 7B and 7C show a state after applying the process. In the sixth step, as shown in FIG. 7A, upper and lower dies 34 and 40, a roller 43 for forming ears, and a straightening roller are prepared. The upper die 34 is provided with a recessed portion 33 which fits the outer shape of the bulging portion 17 of the bottom wall 13 of the cup-shaped forming body 32 obtained by the fifth step. The lower die 40 is provided with a protruded portion 37 including an upper end portion 35 and a vertical peripheral surface 36, and an annular groove 38 formed at a root portion of the protruded portion 37. The roller 43 for forming ears (whose sectional views are shown in FIGS. 7A, 7B and 7C) includes a concave forming surface 41 which is concavely arc-shaped, formed on the axial center of the outer surface, and V-shaped annular projections 42, 42 on the axially both ends of the concave forming surface 41. The straightening roller 45 is provided with a forming surface 44 vertical to the outer surface of the bulging middle portion-peripheral wall. As shown in FIG. 7A, the outer periphery of the protruded portion 37 of the lower die 40 is covered with the cup-shaped forming body 32 obtained by the a fifth step, in a loosely fitted state, and a curved opening end 31a of the bulging middle portion-peripheral wall 31 is engaged with the annular groove 38. With respect to the upper die 34, the bulging portion 17 of the bottom wall 13 of the cup-shaped forming body 32 is engaged with the recessed portion 33 of the upper die 34. In the setting state, the upper die 34 is initially lowered as shown in FIG. 7B. A compressive load is axially applied to the cup-shaped forming body 32, so that an inside of the bulging portion 17 of the cup-shaped forming body 32 may be engaged with the upper portion of the lower die 40, thereby rotating the upper and lower dies 34, 40 around $O_1$. Moreover, the annular projections 42, 42 of the roller 43 for forming ears are pressed in a radially inward direction thereof against the outer surface of the bulging middle portion-peripheral wall 31, at the same time while the roller 43 for forming ears is rotated around $O_2$. As a result, the axially both ends of the bulging middle portion-peripheral wall 31 are folded in a double state so as to be overlapped and closely fitted with each other, thereby protrusively forming the ears 2 including the inner and outer ear portions 2a, 2b. In this case, the annular projections 42, 42 of the roller 43 for forming ears are radially pressed against the bulging middle portion-peripheral wall 31 of the cup-shaped forming body 32, while the compressive load is axially applied thereto, thereby making it easy to fold and shape the inner and outer ear portions 2a, 2b.

Furthermore, as shown in FIG. 7C, the upper and lower dies 34, 40 are rotated around $O_1$, and the vertical forming surface 44 of the straightening roller 45 is pressed in a radially inward direction against a portion between the ears 2, 2 on the both ends of the outer surface of the bulging middle portion-peripheral wall 31, while the straitening roller 45 is rotated around $O_3$, and the bulging middle portion-peripheral wall 31 is axially straightened, thereby obtaining the cup-shaped forming body 47 whose peripheral wall 46 has been shaped to be vertical.

Figure 8:
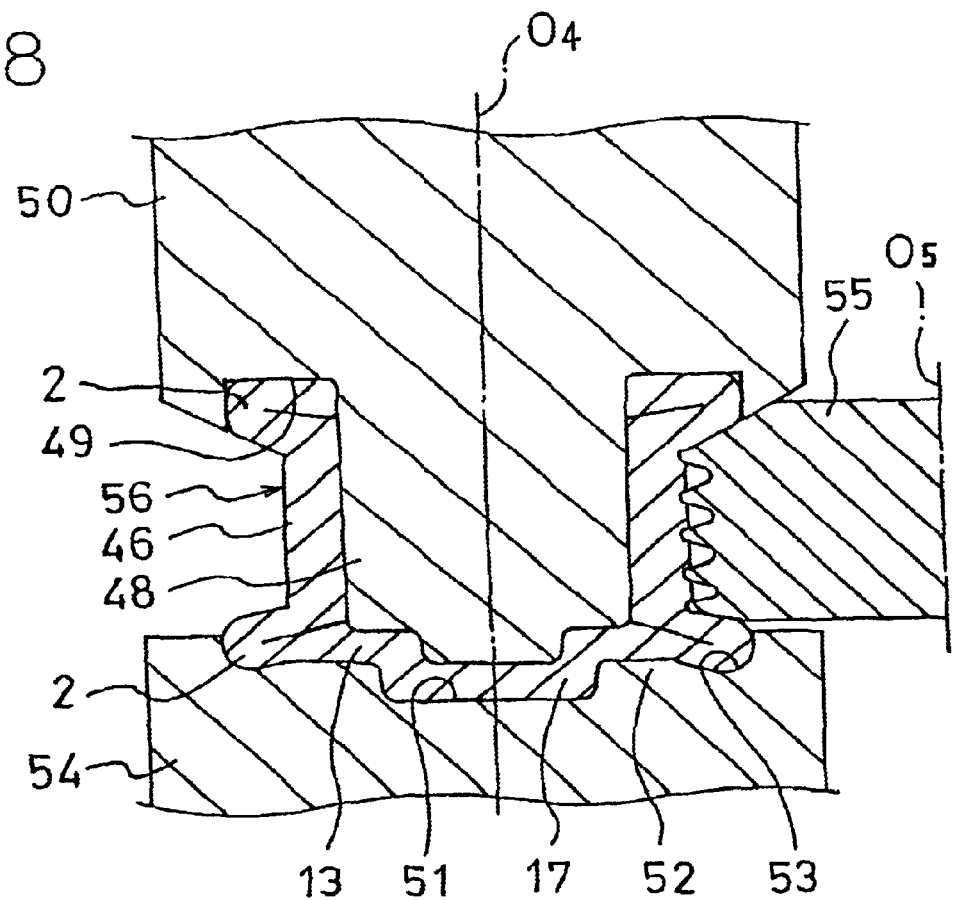
FIG. 8 is a diagram of a seventh step for manufacturing the same.

FIG. 8 shows a seventh step. In this step, upper and lower dies 50, 54, and a rolling roller 55 (shown in a sectional view in FIG. 8) are prepared. The upper die 50 includes a protruded portion 48 which fits a shape of the inside of the cup-shaped forming body 47 obtained by the sixth step, and an annular groove 49 formed on a root portion of the protruded portion 48. The lower die 54 includes a recessed portion 51 which fits an outer shape of the bottom wall 13 of the cup-shaped forming body 47, and an annular groove 53 formed on an outer periphery of the annular projection 52 of an outer periphery of the recessed portion 51. In this step, the cup-shaped forming body 47 obtained by the sixth step is vertically reversed, the bottom wall 13 is engaged with the recessed portion 51 of the lower die 54, and the ear 2 of the bottom wall 13 is engaged with the annular groove 53 of the lower die 54. Then, the upper die 50 is lowered, the protruded portion 48 is engaged with the inside of the cup-shaped forming body 47, and the ear 2 on a side of the opening end of the peripheral wall 46 is engaged with the annular groove 49. The cup-shaped forming body 47 is clamped between the upper and lower dies 50 and 54, thereby enhancing degree of overlap-fitting of the over-lapped ears 2, 2 which has a double structure (especially, degree of overlap-fitting of the ear 2 on a side of the opening end, which is apt to be slightly loosened).

Moreover, in the step of enhancing the degree of overlap-fitting of the ears 2, 2, the upper and lower dies 50, 54 are rotated around $O_4$, and the rolling roller 55 for preliminary shaping poly-V grooves is pressed in a radially inward direction against the outer periphery of the peripheral wall 46, while the rolling roller 55 is rotated around $O_5$. As a result, a cup-shaped forming body 56 may be obtained, which has been subjected to preliminary shaping of the poly-V grooves between the ears 2, 2 on the outer surface of the peripheral wall 46.

Figure 9:
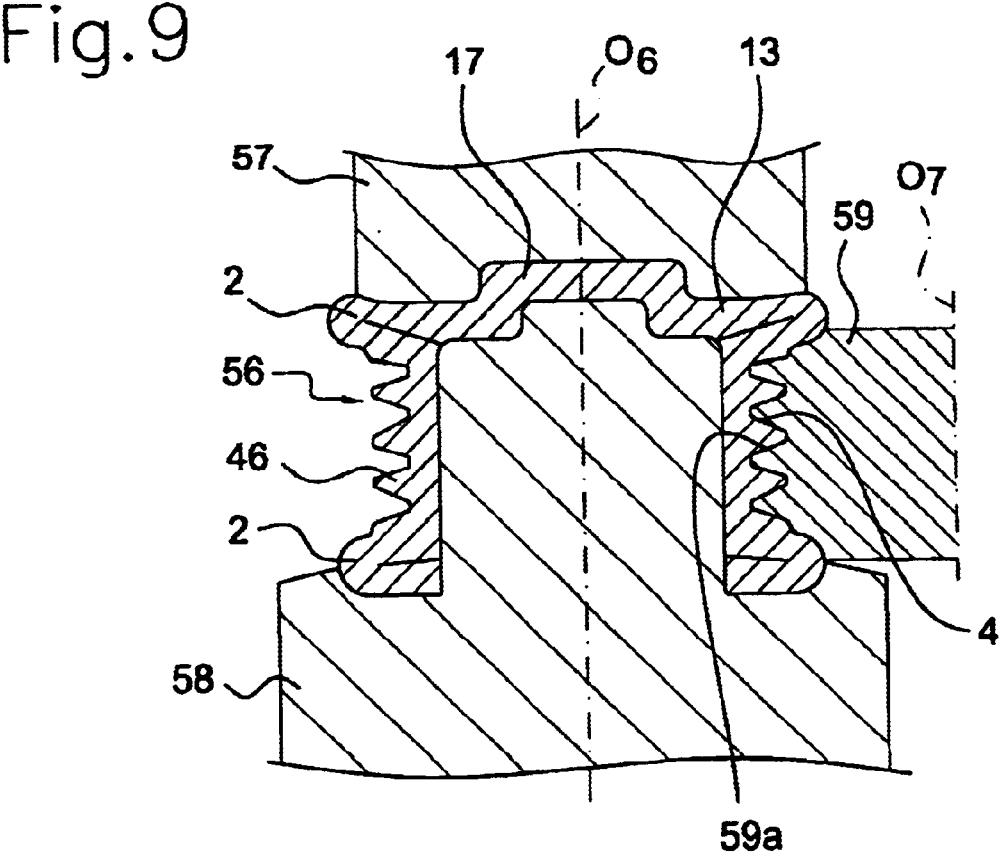
FIG. 9 is a diagram of an eighth step in manufacturing the same.

FIG. 9 shows an eighth step. In this step, the cup-shaped forming body 56 obtained by the seventh step is clamped between the upper and lower dies 57 and 58, so as to be rotatable around axis $O_6$. Against the portion between the ears 2, 2 on the outer surface of the peripheral wall 46 of the cup-shaped forming body 56, a groove 59a of an outer periphery of a rolling roller 59 (shown in a sectional view in FIG. 9) is strongly pressed in a radially inward direction thereof, while the rolling roller 59 is rotated around axis $O_7$, thereby shaping the poly-V grooves 4 as plural V groove-groups between the ears 2, 2 on the outer surface of the peripheral wall 46. Consequently, a cup-shaped forming body 56 is obtained. Though the process for shaping the poly-V grooves 4 may be performed by a once rolling operation, it is more preferable that a number of rolling operations are repeatedly performed, thereby finishing the poly-V grooves so as to have a depth and a pitch as a final shape thereof.

Figure 10:
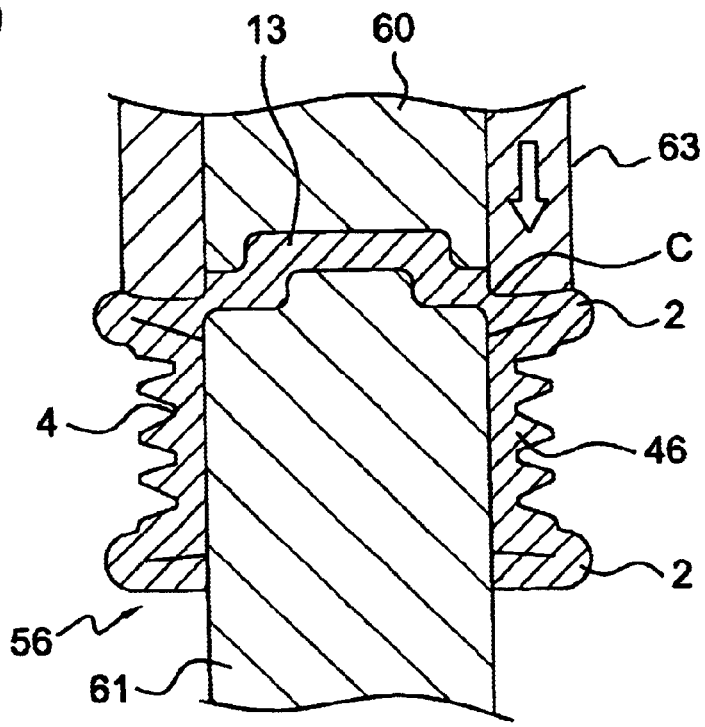
FIG. 10 is a diagram of a ninth step in manufacturing the same.

FIG. 10 shows a ninth step. In this step, the bottom wall 13 of the cup-shaped forming body 56 obtained by the eighth step is clamped between an upper die 60 and a lower die 61. A movable blade 63 for shearing, which is vertically movable, is arranged on the outer peripheral of the upper die 60. The movable blade 63 is lowered, thereby shearing a connecting portion C between the bottom wall 13 and the ear 2 with the result that the bottom wall 13 is pulled out. The connecting portion C is an area on the axial extending line of the inner surface of the peripheral wall 46.

The last step, namely, a tenth step provides a poly-V pulley made of metal sheet as shown in FIG. 1 in a following manner. The inner surface of the cylindrical peripheral wall 46 obtained by the ninth step and the inner end surface 2c of the ear 2 are finished by machining work so as to be flush with each other. In the case of machining work, there are the very thick ears 2, 2 doubly folded on both ends of the peripheral wall 46, and the rigidity of both ends of the peripheral wall 46 is great. Therefore, inward diameter measurements and circularity of the peripheral wall 46 can be accurately finished. Moreover, even after performing the finishing work, a distortion is rarely caused in a bore of the peripheral wall 46, thereby ensuring circularity.

Figure 11:
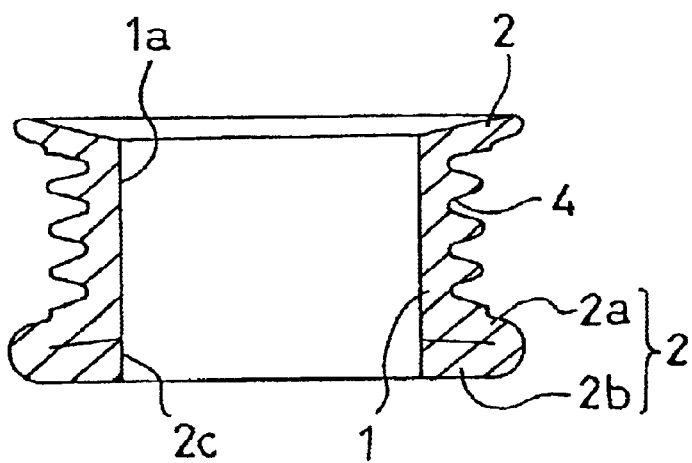
FIG. 11 is a sectional view of another embodiment of the poly-V pulley made of metal sheet according to the present invention.
Figure 12:
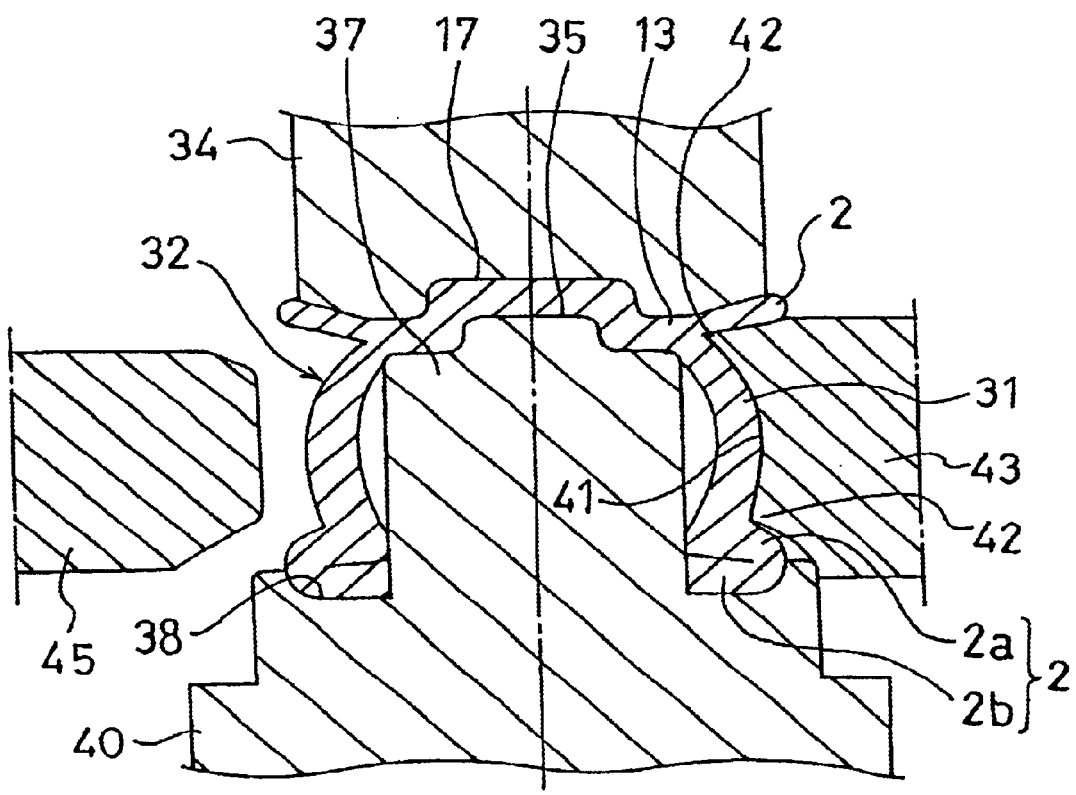
FIG. 12 is a diagram of one step in manufacturing the poly-V pulley made of metal sheet shown in FIG. 11.

As shown in the above embodiment, it is the most preferable that the ears 2, 2 on both ends of the peripheral wall 46 of the poly-V pulley made of metal sheet are respectively formed as multiple layers including the inner and outer ear portions 2a, 2b. However, it may not be limited to the structure. As shown in FIG. 11, it is also allowed that only one ear 2 is formed as multiple layers including the inner and outer ear portions 2a, 2b, and the other ear 2 is a single layer. In this case, for example, in the sixth step of FIG. 7B of the embodiment, the roller 43 for forming ears shown in FIG. 12 is used, whose one annular projection 42 is formed into a sharpened edge blade. In the sixth step, an area where the bottom wall 13 intersects the peripheral wall 31, is subjected to a splitting process by the sharpened edge blade, whereby the ear 2 as the single layer may be formed. The ear 2 as the multiple layers including the inner and outer ear portions 2a, 2b is formed by the other annular projection 42 of the roller 43 for forming ears in the same way as the above embodiment. Except the first to fifth steps and the seventh to tenth steps are performed in the same way as the above embodiment.

Industrial Applicability

According to the present invention, at least one of the ears on both ends of the peripheral wall of the poly-V pulley made of metal sheet, comprises the inner and outer ear portions doubly folded, thereby making it easy to obtain a thick ear from a flat plate material which is not so thick and easy to be drawn. Moreover, this ensures enough length of the axial straight line of the bore of the peripheral portion. Consequently, the cylindrical poly-V pulley made of metal sheet, which is suitable for forcedly fitting a one-way clutch and a bearing, can be easily and economically produced.

What is claimed is:

1. A method of manufacturing a poly-V pulley made of metal sheet, the poly-V pulley made of metal sheet comprising:

a cylindrical peripheral wall, annular ears for preventing a V belt from disengaging, the ears being protrusively formed in axially both ends of an outer surface of the peripheral wall, and poly-V grooves disposed between both ears on the outer surface of the peripheral wall, wherein at least one of the ears includes an inner ear portion protruded from the end of the peripheral wall to the outward direction, and an outer ear portion folded back from the protruded outer end of the inner ear portion to an outer surface of the inner ear portion, so as to be closely fitted therewith, and the inner end surface of the ear is formed to be flush with the inner surface of the peripheral wall, the method comprising the steps of:

forming a cup-shaped forming body which has a bulging middle portion-peripheral wall like a barrel, integrated with an outer periphery of a circular bottom wall;

preparing a roller for forming ears provided with a concave forming surface and an annular projection, the concave forming surface which is concavely arc-shaped being disposed on an axial center portion of the outer surface, and the annular projection whose section is V-shaped being disposed on axially both ends of the concave forming surface;

applying a compressive load to the cup-shaped forming body in the axial direction at the same time while pressing the annular projection of the roller for forming ears against the outer surface of the bulging middle portion-peripheral wall in a radially inward direction thereof, folding, at least axial, one end of the bulging middle portion-peripheral wall into two, protrusively forming inner and outer ear portions overlapped so as to be closely fitted with each other;

pressing a straightening roller having a shaping surface perpendicular to the outer periphery of the bulging middle portion-peripheral wall, against the outer surface of the bulging middle portion-peripheral wall in the radially inward direction thereof, straightening the bulging middle portion-peripheral wall so as to be parallel with the axial direction, and forming the perpendicular peripheral wall;

shaping each poly-V groove between the ears on the outer surface of the perpendicular peripheral wall by means of rolling;

shearing a connecting portion between the bottom wall of the perpendicular peripheral wall and the ear, so as to remove the bottom wall; and finally performing a machining work so as to make the inner end surface of the ear flush with the inner surface of the perpendicular peripheral wall.

* * * * *